(12) United States Patent
Shanks et al.

(10) Patent No.: US 9,955,440 B2
(45) Date of Patent: Apr. 24, 2018

(54) JOINTLY MANAGED ACCESS POINT TRANSMIT POWER CONTROL

(71) Applicant: Cisco Technology, Inc., San Jose, CA (US)

(72) Inventors: Robert Tristan Shanks, San Mateo, CA (US); Mark Gerard Hendrick, Jr., San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 169 days.

(21) Appl. No.: 14/752,805

(22) Filed: Jun. 26, 2015

(65) Prior Publication Data

US 2016/0381645 A1 Dec. 29, 2016

(51) Int. Cl.
| | |
|---|---|
| *H04L 12/50* | (2006.01) |
| *H04W 52/38* | (2009.01) |
| *H04W 52/24* | (2009.01) |
| *H04W 24/10* | (2009.01) |
| *H04W 52/14* | (2009.01) |
| *H04B 17/345* | (2015.01) |
| *H04W 84/12* | (2009.01) |

(52) U.S. Cl.
CPC ......... *H04W 52/386* (2013.01); *H04W 24/10* (2013.01); *H04W 52/243* (2013.01); *H04B 17/345* (2015.01); *H04W 52/143* (2013.01); *H04W 84/12* (2013.01)

(58) Field of Classification Search
CPC .................................................. H04W 52/006
USPC .......................................................... 370/338
See application file for complete search history.

(56) References Cited

U.S. PATENT DOCUMENTS

| | | | |
|---|---|---|---|
| 2012/0071160 A1* | 3/2012 | Das ...................... | H04W 48/16 455/434 |
| 2014/0274093 A1* | 9/2014 | Abdelmonem ....... | H04L 5/0026 455/452.1 |

\* cited by examiner

*Primary Examiner* — Dang Ton
(74) *Attorney, Agent, or Firm* — Ronald Fernando

(57) ABSTRACT

Previously available network monitoring and management systems fail to provide adequate transmit power control in WiFi networks having multiple neighboring wireless access points. By contrast, various implementations disclosed herein include systems, methods and apparatuses that generate an interference map based at least on co-channel interference reported in a number of neighbor lists, wherein each of the neighbor lists is associated with a respective one of a plurality of compliant wireless access points included in one of a local area network (LAN) and a portion of a virtual LAN (VLAN); and determine a respective transmit power adjustment for each of the plurality of compliant wireless access points included in the interference map based on at least one interference criterion characterizing the interference on each of the plurality of compliant wireless access points included in the interference map and respective neighboring wireless access points.

19 Claims, 8 Drawing Sheets

JOINTLY MANAGED ACCESS POINT TRANSMIT POWER CONTROL

TECHNICAL FIELD

The present disclosure generally relates to managing wireless access points, and in particular, to managing interference between multiple access points in a shared space.

BACKGROUND

The ongoing development of data networks often involves enabling greater connectivity by expanding the area covered by a network and/or improving the robustness of accessible coverage within a particular area. Wireless access points (APs) simplify the deployment network infrastructure equipment and enable rapid installation and/or expansion of a network within a coverage area. As a result, various data networks, from local area networks (LANs) to virtual LANs and wide area networks (WANs), now often include a number of wireless APs. Wireless APs also facilitate client device mobility by providing relatively seamless access to a network throughout a coverage area.

Wireless APs typically operate in accordance with WiFi network standards, such as the variants specified under IEEE 802.11. While WiFi networks have proven to be useful for providing and extending network coverage, WiFi networks do not include the same operational management rules that define the operation of cellular wireless networks. For example, WiFi network standards do not provide the same strict specifications for channel usage, channel reuse, and transmission power levels that are found in standards defining cellular wireless networks. Also, the topology of a WiFi network is often unknown or merely vaguely known from an operational perspective because wireless APs are typically deployed in an ad hoc manner in relatively small areas, and are loosely controlled if at all. By contrast, cellular networks are methodically planned, deployed and managed for larger geographically defined coverage areas. So even if rules were provided in the pertinent WiFi standards, the ad hoc nature and loose operational control of a typical WiFi deployment would undermine such rules concerning channel usage, channel reuse, and transmission power levels of multiple APs. Consequently, when multiple wireless APs are located relatively close to one another in the same space interference is often an issue that limits network performance and/or roaming of client devices within the coverage area provided by the combination of wireless APs.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
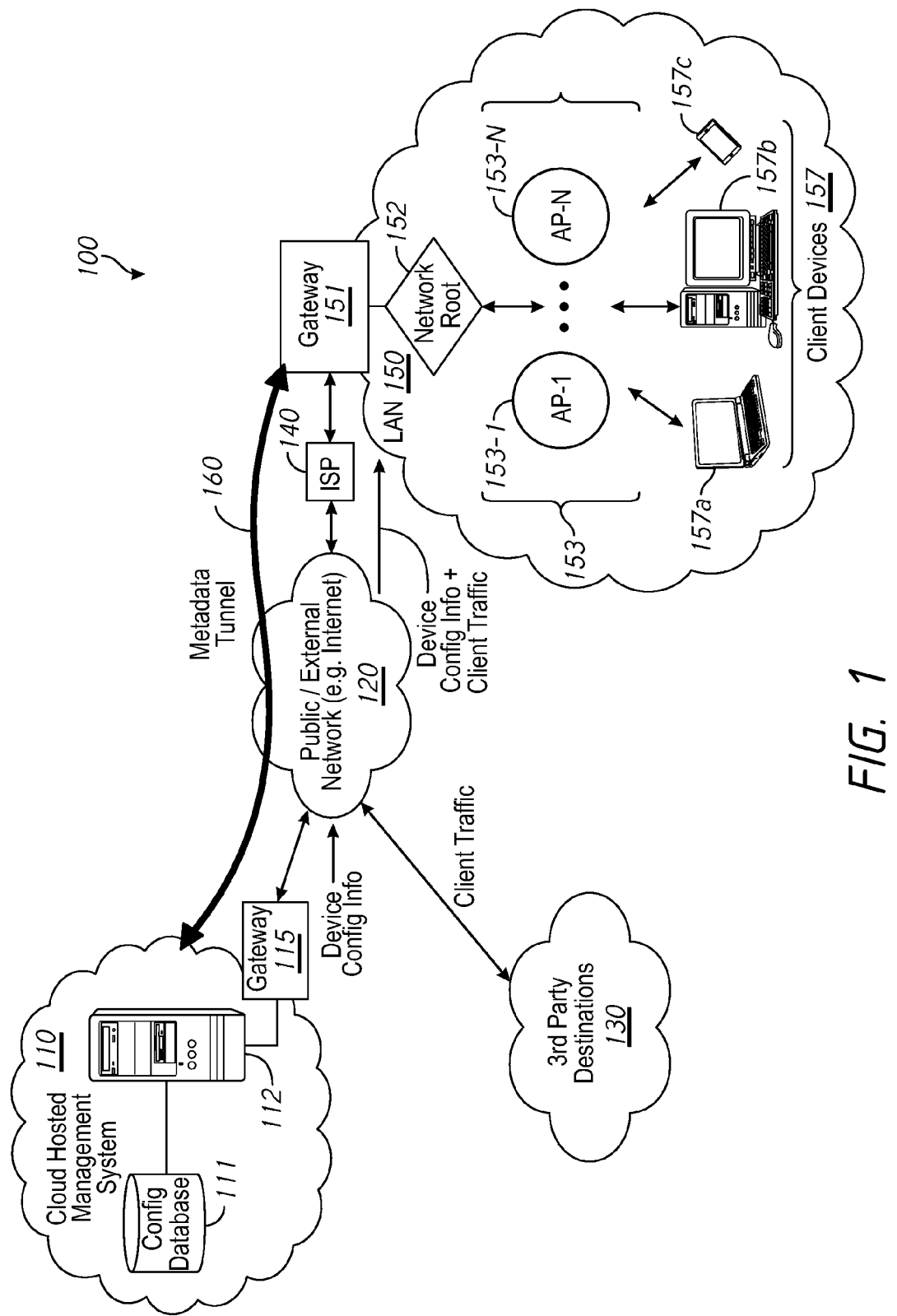
FIG. 1 is a block diagram of a data networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include systems, methods and apparatuses that generate an interference map based at least on co-channel interference reported in a number of neighbor lists, wherein each of the neighbor lists is associated with a respective one of a plurality of compliant wireless access points included in one of a local area network (LAN) and a portion of a virtual LAN (VLAN); and determine a respective transmit power adjustment for each of the plurality of compliant wireless access points included in the interference map based on at least one interference criterion characterizing the interference on each of the plurality of compliant wireless access points included in the interference map and respective neighboring wireless access points.

FIG. 1 is a block diagram of a data networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data networking environment 100 includes a public/external network 120 (e.g., a portion of the Internet), one or more third-party destinations 130 (e.g., providing various third-party content and services), a cloud hosted network management system 110, an Internet service provider (ISP) node 140 and a local area network (LAN) 150.

The one or more third-party destinations 130 provide various third-party content and services, such as email, media content (e.g., video, music, gaming, etc.), online banking, social networking servers, etc. Other than providing sources and/or destinations for client data traffic, an exhaustive description of the numerous examples of third-party destinations are not particularly pertinent to the scope of the present disclosure. As such, no further details pertaining to the one or more third-party destinations 130 are provided for the sake of brevity.

In various implementations, the LAN 150 includes a gateway node 151, a network root node 152, a number of compliant wireless APs 153 (e.g., AP-1 153-1, . . . , AP-N 153-N), and a number of client devices 157. The gateway device 151 connects the LAN 150 to the public network 120 through the ISP node 140, and includes features such as a firewall. In some implementations, the gateway device 151 is provided as a single entity (e.g., a server, a virtual machine, etc.). In some implementations, the gateway device 151 includes a distributed system including a suitable combination of software, data structures, virtual machines, computing devices, servers, switches and routers. Merely for the sake of brevity and convenience of explanation, the gateway device 151 is described herein as a single entity.

In some implementations, the root node 152 is a virtual node or logical place-holder within the LAN 150. In such instances, the root node 152 merely provides a convenient LAN node that is separate from the gateway node 151. In some implementations, the root node 152 is a physical device that is separate from the gateway node 151. In some implementations, the root node 152 is included as a part of the gateway node 151.

Client devices 157 generally include any suitable computing device, such as a computer, a laptop computer, a tablet device, a netbook, an internet kiosk, a personal digital assistant, a mobile phone, a smartphone, a wearable, a gaming device, a computer server, etc. In some implementations, each client device (e.g., laptop 157a, workstation 157b, smartphone 157c, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control.

In various implementations, the difference between the compliant wireless APs 153 and non-compliant networking devices (not shown) is based at least on the extent to which a device is able to functionally cooperate with the cloud hosted network management system 110. In some implementations, compliant devices, including the compliant wireless APs 153, are configured to communicate and operate in accordance with configuration instructions, software and/or firmware updates, and rules provided by the cloud hosted network management system 110. To that end, in accordance with some implementations, a metadata tunnel 160 is established from the gateway node 151 of the LAN 150 to the gateway node 115 of the cloud hosted network management system 110.

The cloud hosted network management system 110 is configured to manage the configuration and operation of compliant devices in a LAN and/or across geographically distributed portions of a VLAN. To that end, the cloud hosted network management system 110 includes a configuration database 111, a cloud hosted network management server 112, and a gateway device 115. The gateway device 115 connects the cloud hosted network management server 112 to the public network 120 so that the cloud hosted network management server 112 is able to communicate with one or more LANs and/or geographically distributed portions of a VLAN, and includes features such as a firewall. In some implementations, the gateway device 115 is provided as a single entity (e.g., a server, a virtual machine, etc.). In some implementations, the gateway device 115 includes a distributed system including a suitable combination of software, data structures, virtual machines, computing devices, servers, switches and routers. Merely for the sake of brevity and convenience of explanation, the gateway device 115 is described herein as a single entity.

In some implementations, the ISP node 140 is provided to link the LAN 150 to the public network 120, and serves as a network service provider access point. Similar to the gateway nodes 115, 151, in various implementations, the ISP node 150 is provided as a single entity (e.g., a server, a virtual machine, etc.). In some implementations, the ISP node 150 is implemented as a distributed system including a suitable combination of software, data structures, virtual machines, computing devices, servers, switches and routers. For the sake of brevity and convenience of explanation, the ISP node 150 is described herein as a single entity.

Figure 2:
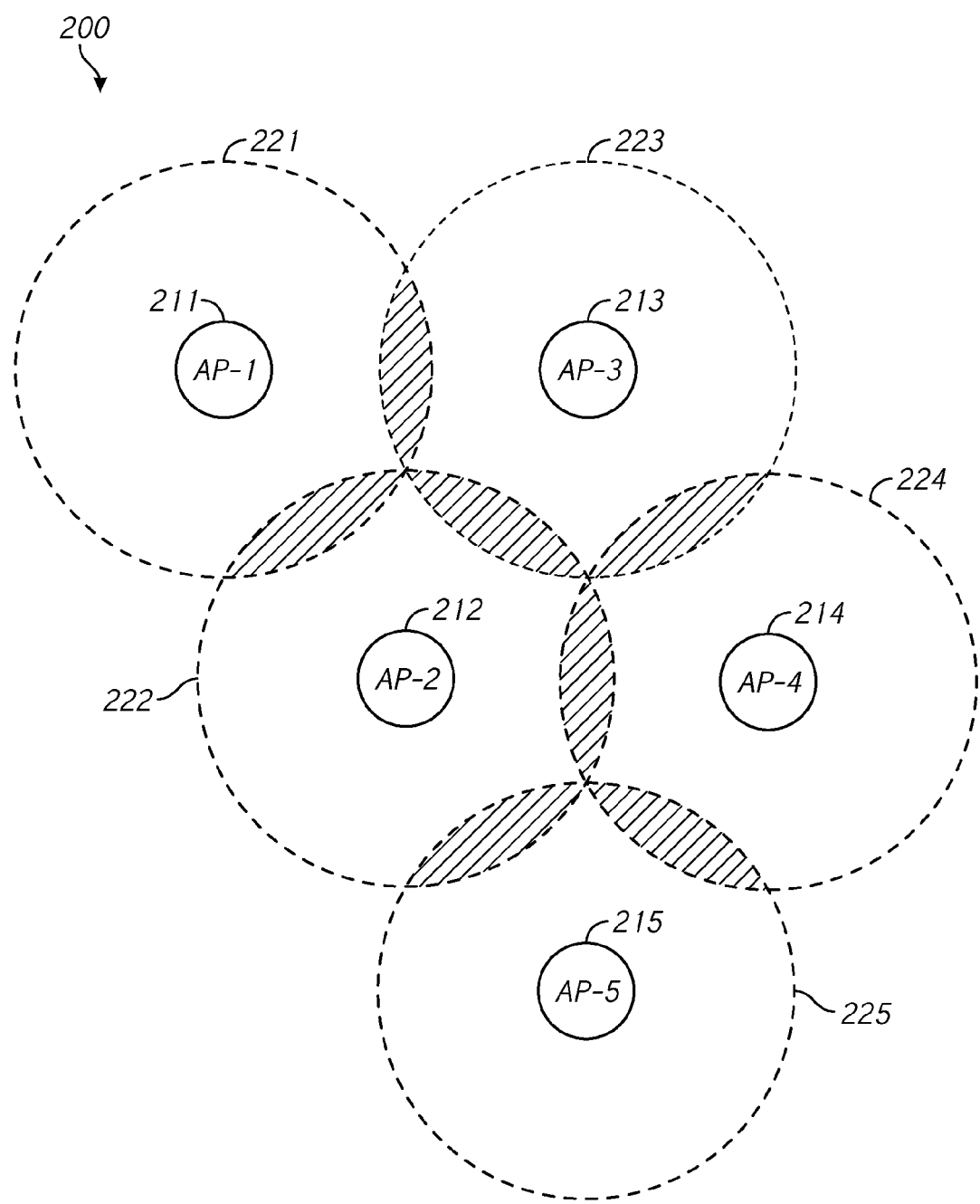
FIG. 2 is a schematic diagram of an example coverage map of a WiFi network in accordance with some implementations.

FIG. 2 is a schematic diagram of an example coverage map 200 of a WiFi portion of a network in accordance with some implementations. The coverage map 200 includes five wireless APs, namely, a first wireless AP (AP-1) 211, a second wireless AP (AP-2) 212, a third wireless AP (AP-3) 213, a fourth wireless AP (AP-4) 214, and a fifth wireless AP (AP-5) 215. While five APs are shown as an example, those of ordinary skill in the art will appreciate that various implementations include any number of wireless APs, which are arranged in a space according to user and/or network operator preferences. Those of ordinary skill in the art will also appreciate from the present disclosure that various features have not been illustrated for the sake of brevity and so as not to obscure more pertinent aspects of the coverage map 200 as they relate to example implementations disclosed herein.

Each of the five wireless APs 211, 212, 213, 214, 215 provide a respective coverage area. More specifically, the first wireless AP 211 provides a first coverage area 221. The second wireless AP 212 provides a second coverage area 222. The third wireless AP 213 provides a third coverage area 223. The fourth wireless AP 214 provides a fourth coverage area 224, and the fifth wireless AP 215 provides a fifth coverage area 225. Even though FIG. 2 illustrates the five coverage areas 221, 222, 223, 224, 225 as two-dimensional, a respective coverage area of a wireless AP occupies a three-dimensional range emanating from the wireless AP. On the forward path, the three-dimensional range is typically characterized by a distance from the wireless AP over which signals transmitted by the wireless AP are received above a particular threshold power level by another device. On the reverse path, the three-dimensional range is typically characterized by a distance from the wireless AP over which incoming signals are received within an antenna lobe pattern(s) of the wireless AP, making them detectable by a receiver at the wireless AP above a particular threshold power level by another device. Those of ordinary skill in the art will appreciate that the three-dimensional range of a wireless AP is a function of characteristics of one or more antennas included in the wireless AP and the transmission power capacity of the wireless AP in addition to other factors. Since the transmission power level can be conveniently manipulated, the transmission power level can be used to adjust the size of the coverage area or of a wireless AP in operation. Within limits, the greater the transmission power level, the further away other devices (including client devices and other APs) can be from a wireless AP and still receive forward channel signals from the wireless AP. The ability of a client device (not shown) to communicate on a reverse channel to a particular wireless AP is a function of the transmission power capacity of the client device, which can be less than the transmission power capacity of a wireless AP. The reverse channel range is also a function of the characteristics of the one or more antennas included in the wireless AP and the transmission power capacity of the wireless AP in addition to other factors.

Interference between wireless APs is a result of one wireless AP receiving forward channel transmission signals from another wireless AP when the two wireless APs share at least a portion of the frequency spectrum used for communication within the network. The severity of interference between two wireless APs is a function of the amount of coverage area overlap and the amount of frequency band overlap based on the channel usage of the two wireless APs. For example, with continued reference to FIG. 2, the first coverage area 221 overlaps with the second and third coverage areas 222, 223. The second coverage area 222 also overlaps with the third, fourth and fifth coverage areas 223, 224, 225. And the fourth coverage area 224 also overlaps with the third and fifth coverage areas 223, 225. When two wireless APs with overlapping coverage areas transmit on at least a portion of the same channel(s), the two wireless APs will likely interference with each other to some degree. Continuing with the example, because the second coverage area 222 overlaps with the first, third, fourth and fifth coverage areas 221, 223, 224, 225, the second wireless AP 212 is susceptible to interference from the first, third, fourth and fifth wireless APs 211, 213, 214, 215 when the wireless APs use all or portions of the same channels.

Figure 3:
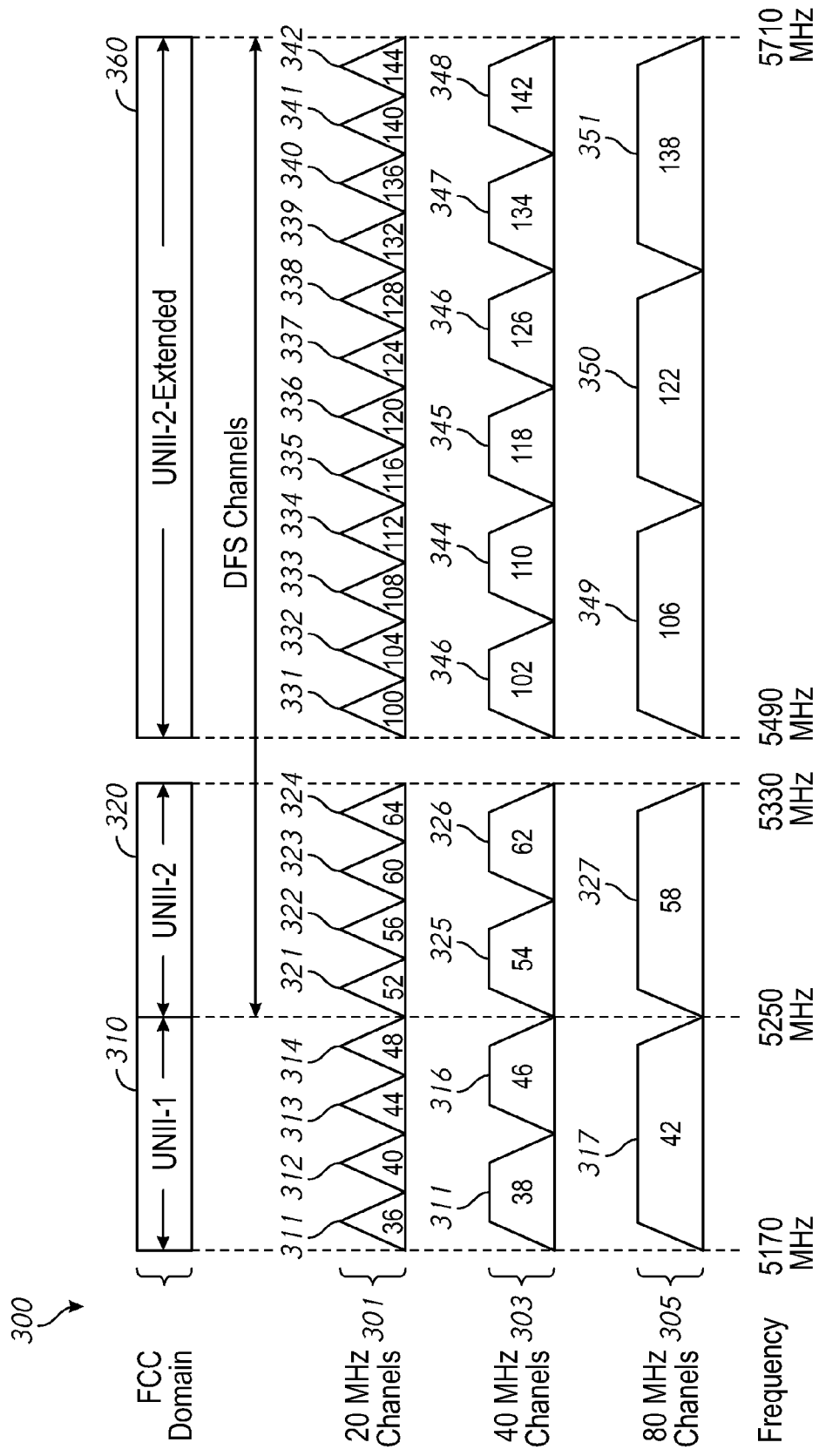
FIG. 3 is a channel allocation diagram as specified by IEEE 802.11ac and suitable for use with systems enabled in accordance with some implementations.

FIG. 3 is a channel allocation diagram 300 as specified by IEEE 802.11ac and suitable for use with systems provided in accordance with some implementations. The IEEE 802.11 standards specify the channel labels and allocations in the frequency spectrum between 5170 MHz and 5815 MHz. Merely for the sake of brevity, only the channel allocations in the frequency band between 5170 MHz and 5710 MHz are described in association with the examples provided herein. However, those of ordinary skill in the art will appreciate from the present disclosure that various implementations are also configured for use with the wider frequency band and even other bands, including, but not limited to the ISM (industrial, scientific, medical) band.

The channel allocation diagram 300 illustrates three FCC frequency domains, namely UNII-1 frequency domain 310, UNII-2 frequency domain 320, and UNII-2-Extended frequency domain 360. The UNII-1 frequency domain 310 defines the frequency band usage and allocations between 5170 MHz and 5250 MHz. The UNII-2 frequency domain 320 defines the frequency band usage and allocations between 5250 MHz and 5330 MHz. The UNII-2-Extended frequency domain 360 defines the frequency band usage and allocations between 5490 MHz and 5710 MHz. The three FCC frequency domains includes 20 MHz channels (301), 40 MHz channels (303), 80 MHz channels (305), and 160 Hz channels (not shown).

The UNII-1 frequency domain 310 includes some of the 20 MHz channels (301), some of the 40 MHz channels (303), one of the 80 MHz channels (305), and a portion of a 160 Hz channel (not shown) that extends across the UNII-1 frequency domain 310 and the UNII-2 frequency domain 320. The 20 MHz channels include channels 36, 40, 44, 48 as defined by IEEE 802.11ac that reside in frequency bands 311, 312, 313, 314. The 40 MHz channels include channels 38, 46 as defined by IEEE 802.11ac that reside in frequency bands 315, 316. The 80 MHz channel, of the UNII-1 frequency domain 310, includes channel 42 as defined by IEEE 802.11ac, and resides in a frequency band 317. Channel 42 occupies the entirety of the UNII-1 frequency domain 310.

The channels included within both the UNII-2 frequency domain 320 and the UNII-2-Extended frequency domain 360 are also known as the dynamic frequency selection (DFS) channels. The UNII-2 frequency domain 320 includes some of the 20 MHz channels (301), some of the 40 MHz channels (303), one of the 80 MHz channels (305), and a portion of a 160 Hz channel (not shown) that extends across the UNII-1 frequency domain 310 and the UNII-2 frequency domain 320. The 20 MHz channels include channels 52, 56, 60, 64 as defined by IEEE 802.11ac that reside in frequency bands 321, 322, 323, 324. The 40 MHz channels include channels 54, 62 as defined by IEEE 802.11ac that reside in frequency bands 325, 326. The 80 MHz channel includes channel 58 as defined by IEEE 802.11ac, and resides in frequency band 327. As can be seen in FIG. 3, the 80 MHz channel 58 occupies the entirety of the UNII-2 frequency domain 320.

The UNII-2-Extended frequency domain 360 includes some of the 20 MHz channels (301), some of the 40 MHz channels (303), some of the 80 MHz channels (305), and some 160 Hz channels (not shown). The 20 MHz channels include channels 100, 104, 108, 112, 116, 120, 124, 128, 132, 136, 140, 144 as defined by IEEE 802.11ac that reside in frequency bands 331, 332, 333, 334, 335, 336, 337, 338, 339, 340, 341, 342. The 40 MHz channels include channels 102, 110, 118, 126, 134, 142 as defined by IEEE 802.11ac that reside in frequency bands 343, 344, 345, 346, 347, 348. The 80 MHz channels include channel 106, 122, 138 as defined by IEEE 802.11ac that reside in frequency bands 349, 350, 351.

Figure 4:
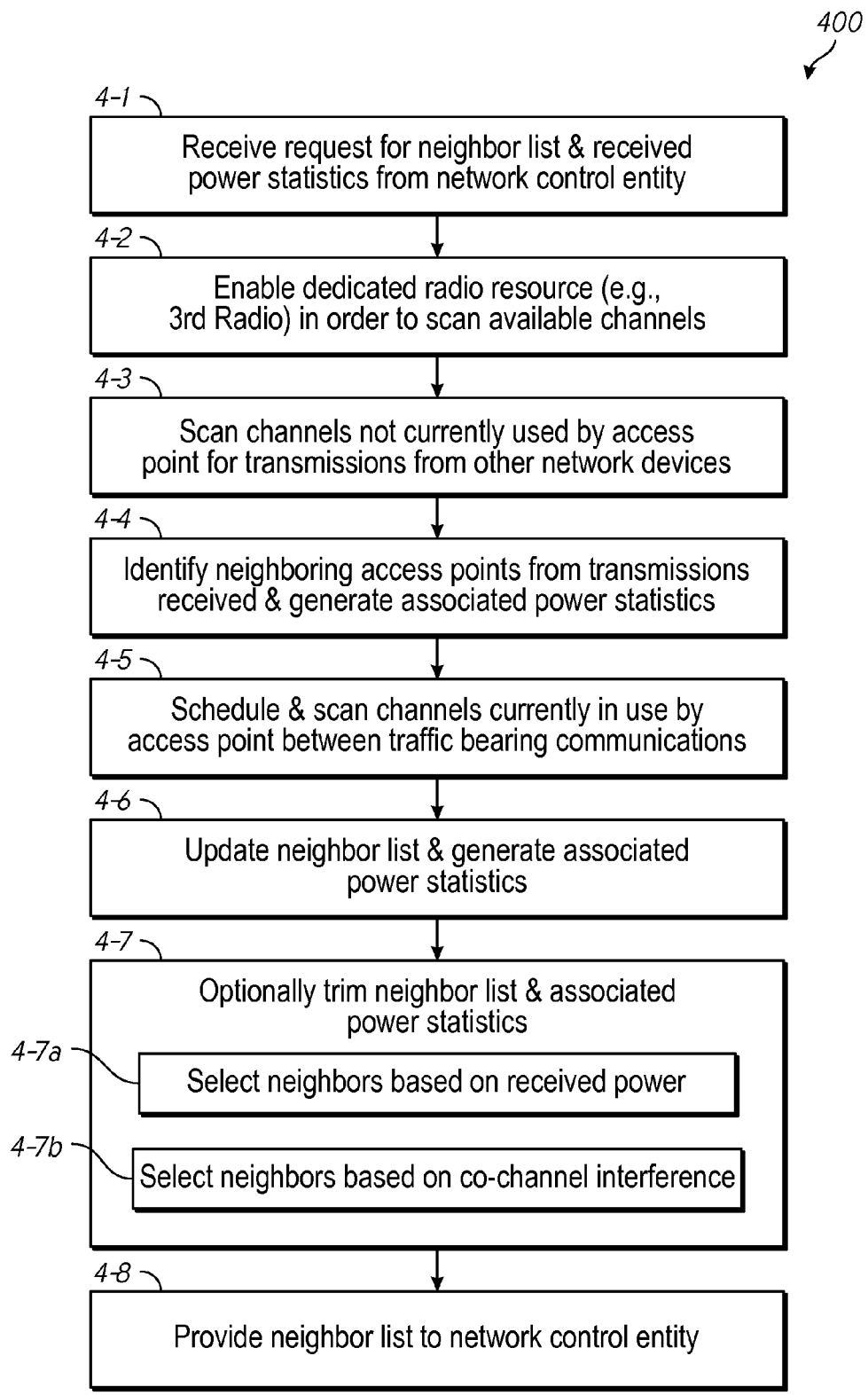
FIG. 4 is a flowchart representation of a method of generating a neighbor list at a wireless AP in accordance with some implementations.

FIG. 4 is a flowchart representation of a method 400 of generating a neighbor list in accordance with some implementations. In some implementations, the method 400 is performed by a neighbor discovery module included in a compliant wireless AP, the neighbor discovery module including a suitable combination of hardware, firmware and/or software. Briefly, the method 400 includes utilizing a radio resource to scan available channels in order to identify neighboring wireless APs to produce a neighbor list, and curating the resulting neighbor list in order to limit the neighbor list to a listing of pertinent neighboring wireless APs that are likely to interfere with the scanning wireless AP.

To that end, as represented by block 4-1, the method 400 includes receiving a request for a neighbor list and received power statistics from a network control entity. For example, with reference to FIG. 1, the compliant wireless AP-1 (153-1) receives a request for a neighbor list and received power statistics from the cloud hosted network management server 112 via the metadata tunnel 160. In another example, the compliant wireless AP-1 (153-1) receives the request from gateway node 151 or the network root node 152. As represented by block 4-2, the method 400 includes enabling a dedicated radio resource (e.g., a third radio transceiver) in order to scan channels that are available for use for by the compliant wireless AP. For example, with reference to FIG. 3, the various channels specified by IEEE 802.11ac introduced above are available to a wireless AP configured to operate in accordance with IEEE 802.11ac. A typical wireless AP includes two radio transceivers for communication with various client devices within an associated coverage area. Thus, in accordance with various implementations, a wireless AP is equipped with a third dedicated radio transceiver that enables the wireless AP to scan the available channels without interrupting communications on the two primary radios or reducing the traffic supporting capacity of the two primary radios. In some implementations, the third dedicated radio transceiver is enabled on boot (or power-up) of the wireless AP, and is thus used in a continuous or a pre-determined periodic manner to scan the available channels without interrupting communications on the two primary radios or reducing the traffic supporting capacity of the two primary radios. In some implementations, a continuous or a periodic scanning schedule is dynamically generated based at least on one of current traffic patterns and demand, and historical traffic patterns and demand. In other implementations, a dedicated radio resource includes scheduling time slots during which the primary radio resources are used to scan the available channels (i.e., time multiplexing diagnostic scanning). The time slots are scheduled between traffic bearing time slots provided by the two primary radios in order to collect interference measurements by the wireless AP.

As represented by block 4-3, the method 400 includes scanning channels not currently used by the wireless AP for transmissions from other network devices. For example, with reference to FIGS. 2 and 3, if the second wireless AP 212 is currently using channels 106, 122 and 138 in the UNII-2-Extended frequency domain 360, the second wireless AP 212 scans the 20 MHz channels (301), the 40 MHz channels (303), the 80 MHz channels (305) in the UNII-1 frequency domain 310 and UNII-2 frequency domain 320 described above. As represented by block 4-4, the method 400 includes identifying neighboring wireless APs from the transmissions received on channels not currently being used by the wireless AP and generating associated power statistics for the identified neighboring wireless APs. Extending the example, as a result of the second wireless AP 212 scanning the channels (i.e., frequency bands) that it is not using, the second wireless AP 212 detects that the first, third and fourth wireless APs 211, 213, 214 are respectively transmitting on channels 36, 44 and 62. In some implementations, the second wireless AP 212 is able to detect and recognize the neighboring wireless APs by receiving transmissions that are each above a threshold power level, and demodulating and parsing the received transmissions in order to detect a respective device identifier associated with each of the neighboring wireless APs. The second wireless AP 212 also generates received power statistics characterizing the received transmissions from the first, third and fourth wireless APs 211, 213, 214. Received power statistics include, for example, at least one of average received power levels, peak received power levels, minimum received power levels, and statistics characterizing frequency of transmissions, duration of transmissions, signal-to-noise ratios, and adjacent channel interference. Those of ordinary skill in the art will appreciate from the present disclosure that various other types of statistics can be determined and/or generated from received transmissions from neighboring wireless APs.

As represented by block 4-5, the method 400 includes scheduling and scanning on channels currently in use by the wireless AP between traffic bearing communications to and from client devices. In other words, a wireless AP is operated to scan the channels it is currently using to communicate with client devices for detectable transmissions from other wireless APs. In various implementations, in order to facilitate more accurate detection of interfering transmissions from neighboring wireless APs, the wireless AP scans channels in between receiving communications from the client devices. In some implementations, the wireless AP schedules quiet periods on the channels in use in part by instructing client devices in its coverage area not to transmit during particular time slots. In some implementations, the wireless AP uses a dedicated radio resource to scan the channels in use while the channels are actively being used by at least one of the wireless AP and one or more client devices. In other words, in some implementations, as noted above, the third dedicated radio transceiver is used in a continuous or a pre-determined periodic manner to scan the available channels without interrupting communications on the two primary radios or reducing the traffic supporting capacity of the two primary radios. In some implementations, a continuous or a periodic scanning schedule is dynamically generated based at least on one of current traffic patterns and demand, and historical traffic patterns and demand.

As represented by block 4-6, the method 400 includes updating the neighbor list to include one or more neighboring wireless APs that are transmitting on the at least a portion of one or more of the same channels as used by the wireless AP, and generating associated power statistics for any newly identified neighboring wireless APs. Continuing to extend the example introduced above, as a result of the second wireless AP 212 scanning the channels (or frequency bands) that it is using, the second wireless AP 212 detects that the fifth wireless AP 215 is transmitting on channels 102 and 116. As described above, the second wireless AP 212 also generates received power statistics characterizing the received transmissions from the fifth wireless AP 215.

As represented by block 4-7, the method 400 includes optionally trimming the neighbor list and the associated power statistics. In some implementations, the neighbor list is trimmed, if applicable, to include identified neighboring wireless APs that satisfy one or more interference criteria. For example, and without limitation, limiting the neighbor list of a wireless AP including trimming, if applicable, the list to include the top three interfering neighboring wireless APs. In some implementations, as represented by block 4-7a, the method 400 includes trimming the neighbor list by selecting neighbors based on received power. For example, a neighboring wireless AP is selected to remain on the list if the received power of transmissions from that neighboring wireless AP are above a particular threshold that characterizes an undesirable level of interference. In some implementations, as represented by block 4-7b, the method 400 includes trimming the neighbor list by selecting neighbors based on co-channel (i.e., same channel) interference. For example, a neighboring wireless AP is selected to remain on the list if the received power of transmissions from that neighboring wireless AP are received within at least a portion of the same channel(s) that are being used by the wireless AP. Continuing the example introduced above, the fifth wireless AP 215 is selected to remain on the neighbor list produced by the second wireless AP 212 because the fifth wireless AP 215 is transmitting on channels that at least partially overlap with the channels being used by the second wireless AP 212. In some implementations, at least one of the first, third and fourth wireless APs 211, 213, 214 remain on the neighbor list when, for example, the received power of transmissions is above a threshold level, and the channels are adjacent to channels used by the second wireless AP 212. Additionally and/or alternatively, in some implementations as described below with reference to FIG. 5, a wireless network AP controller operates to trim neighbor lists and associated power statistics reported from a number of reporting wireless APs.

As represented by block 4-8, the method 400 includes providing the neighbor list to the network control entity. For example, neighbor lists are provided to the cloud hosted network management server 112 using the metadata tunnel 160 from one or more compliant APs within the LAN 150, when the network control entity resides in the cloud hosted network management server 112 (or generally within the cloud hosted network management system 110). In another example, neighbor list are provided to the gateway node 151 or the network roots node 152 from one or more compliant APs within the LAN 150, when the network control entity resides within the LAN 150.

Figure 5:
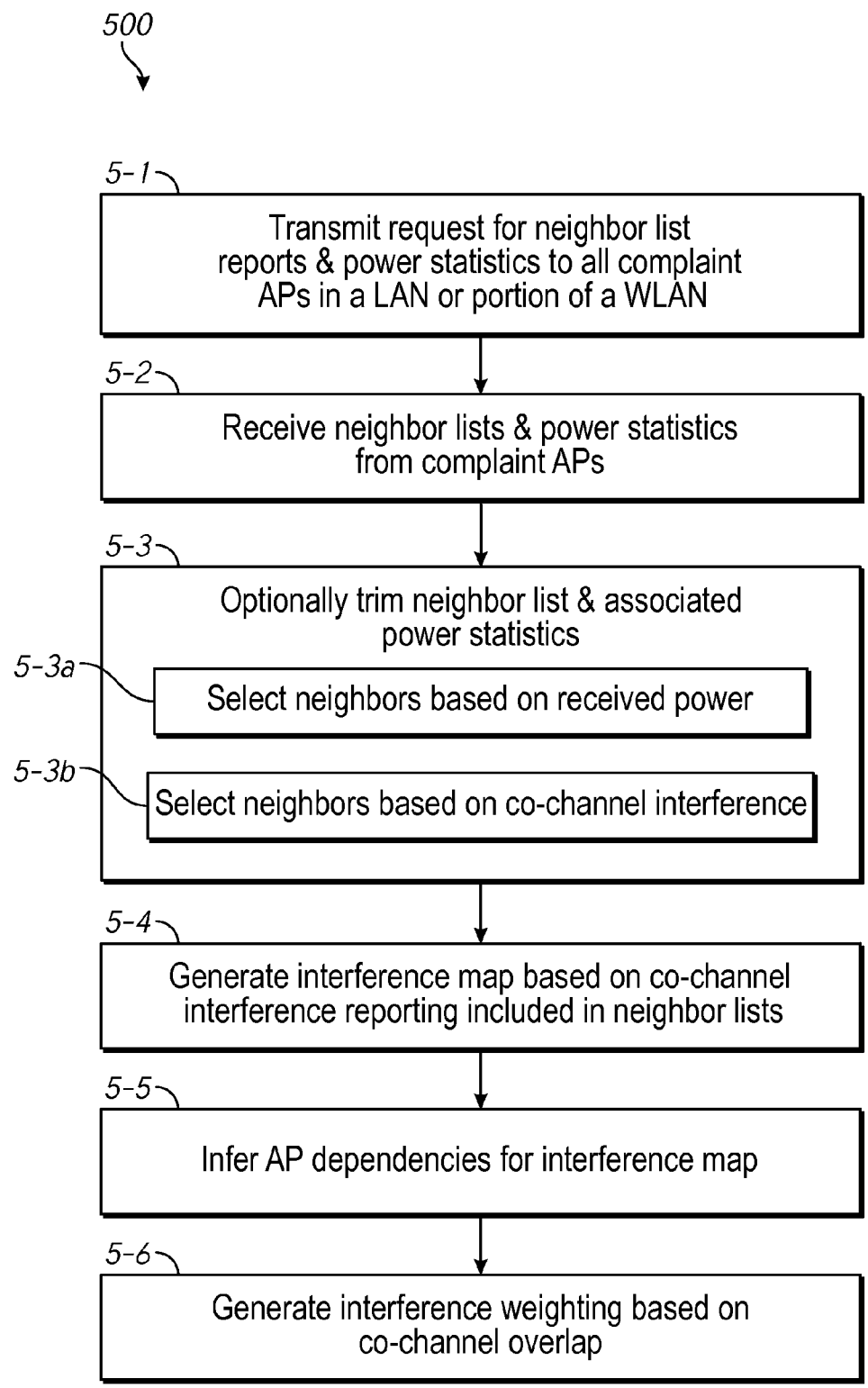
FIG. 5 is a flowchart representation of a method of generating an interference map at a wireless network AP controller in accordance with some implementations.

FIG. 5 is a flowchart representation of a method 500 of generating an interference map according to some implementations. In some implementations, the method 500 is performed by a wireless network AP controller. For example, with reference to FIG. 1, in some implementations, the wireless network AP controller is integrated and/or co-located with the cloud hosted network management server 112, or more generally, in the cloud hosted network management system 110. The wireless network AP controller, in such implementations, is configured to coordinate the operation of a number of compliant wireless APs 153 by way of communicating instructions through the metadata tunnel 160 to the LAN 150. In some implementations, the wireless network AP controller is integrated and/or co-located with one of the gateway node 151 and the network root node 152, and is configured to coordinate the operation of a number of compliant wireless APs 153 locally within the LAN 150. Briefly, the method 500 includes generating an interference map based on neighbor lists received from compliant wireless APs, inferring dependencies and generating interference weighting between compliant wireless APs.

To that end, as represented by block 5-1, the method 500 includes transmitting a request for neighbor list reports and associated power statistics to all compliant APs in a LAN or portion of a VLAN including a number of wireless APs that are proximate to one another. For example, with reference to FIG. 1, the cloud hosted network management server 112 transmits a request using the metadata tunnel 160 to the LAN 150. The request is received by the gateway node 150 which, in turn, broadcasts the request to the compliant APs 153 within the LAN 150.

As represented by block 5-2, the method 500 includes receiving neighbor lists and associated power statistics from compliant wireless APs from the LAN or the portion of the VLAN. For example, the compliant wireless APs 153 generate neighbor lists and the associated power statistics (as described above with reference to FIG. 4), and transmit that information to the cloud hosted network management server 112 back through the metadata tunnel 160. In some implementations, the compliant wireless APs 153 report the information to one of the gateway node 151 or the root node 152, which either relay the information to the cloud hosted network management server 112 or retain and use the information locally to generate an interference map.

As represented by block 5-3, the method 500 includes optionally trimming the neighbor list and the associated power statistics. In some implementations, a neighbor list from a particular AP is trimmed, if applicable, to include identified neighboring wireless APs that satisfy one or more interference criteria. For example, and without limitation, limiting the neighbor list of a wireless AP including trimming, if applicable, the list to include the top three interfering neighboring wireless APs. In some implementations, as represented by block 5-3a, the method 500 includes trimming the neighbor list by selecting neighbors based on received power. For example, a neighboring wireless AP is selected to remain on the list if the received power of transmissions from that neighboring wireless AP are above a particular threshold that characterizes an undesirable level of interference. In some implementations, as represented by block 5-3b, the method 500 includes trimming the neighbor list by selecting neighbors based on co-channel (i.e., same channel) interference. For example, a neighboring wireless AP is selected to remain on the list if the received power of transmissions from that neighboring wireless AP are received within at least a portion of the same channel(s) that are being used by the wireless AP. Continuing the example introduced above, the fifth wireless AP 215 is selected to remain on the neighbor list produced by the second wireless AP 212 because the fifth wireless AP 215 is transmitting on channels that at least partially overlap with the channels being used by the second wireless AP 212. In some implementations, at least one of the first, third and fourth wireless APs 211, 213, 214 remain on the neighbor list when, for example, the received power of transmissions is above a threshold level, and the channels are adjacent to channels used by the second wireless AP 212.

As represented by block 5-4, the method 500 includes generating an interference map based on co-channel interference reporting included in the neighbor lists. In some implementations, the interference map also includes adjacent channel interference indicators, when received transmissions from neighboring wireless APs are above a threshold level on channels that are adjacent to channels used by a particular wireless AP. In some implementations, the interference map includes a listing of relational interference indicators that characterize the interference between wireless APs. Continuing the example above, in some implementations, an interference map corresponding to the coverage map 200 includes relational interference indicators that the fifth wireless AP 215 provides interference on channels 106 and 122 used by the second wireless AP 212, and that the second wireless AP 212 provides interference on channels 102 and 116 used by the fifth wireless AP 215. By contrast, in the example above, in some implementations, the interference map corresponding to the coverage map 200 does not include relational interference indicators for the second and third wireless APs 212, 213 because the second and third wireless APs 212, 213 are not transmitting on the same channels. However, in some implementations, an interference map includes adjacent channel interference indicators, when received transmissions from neighboring wireless APs are above a threshold level on channels that are adjacent to channels used a particular wireless AP. For example, in some implementations, an interference map corresponding to the coverage map 200 includes relational adjacent interference indicator that the fourth wireless AP 214 provides interference on channel 64 that is adjacent to channel 102 used by the second wireless AP 212 when the received transmissions from the fourth wireless AP 214 are above a threshold level, as received by the second wireless AP.

As represented by block 5-5, the method 500 includes inferring wireless AP dependencies based on the neighbor list information. For example, using the received neighbor information, the wireless network AP controller determines which of the reporting APs receive detectable signals from one or more other APs, and the corresponding signal strength (e.g., power level) associated with each of the received detectable signals received by a particular reporting AP. The wireless network AP controller then adds an AP representation (or tag) to the interference map in response to determining that a signal from the AP is detectable by a particular one of its neighboring APs, and that the two APs are included in the same network. In some implementations, determining that a signal is detectable includes receiving signal power associated with the signal that breaches a threshold level. In some implementations, determining that two APs are in the same network includes comparing respective network IDs associated with each. In some implementations, obtaining a network ID includes identifying a MAC (media access control) address from a frame received from an AP, and using the identified MAC address to lookup a corresponding network ID in a network configuration database (or the like).

As represented by block 5-6, the method includes generating interference weightings based on the amount co-channel overlap. In some implementations, an interference weight associated with a first wireless AP on a particular channel is a normalized ratio characterizing how much channel usage of a second wireless AP overlaps with channel usage of the first wireless AP. In some implementations, each wireless AP has a primary 20 MHz channel regardless of the entire width of the channel that it is using (e.g., the 80 MHz channel 106). As such, when a wireless AP attempts to transmit using its full channel width and is unable to secure the whole transmission bandwidth of the channel, the wireless AP switches to a lower bandwidth channel and tries again (and so on). Continuing the example above with reference to FIGS. 2 and 3, if the second wireless AP 212 is using primary channel 100 cannot secure the 80 MHz channel 106, the second wireless AP 212 will attempt to use the 40 MHz channel 102, since channel 102 includes the primary channel 100. And if the second wireless AP 212 cannot secure the 40 MHz channel 102, it will revert to attempting to use merely its primary channel 100. In a separate example, if the second wireless AP 212 is using primary channel 108 cannot secure the 80 MHz channel 106, the second wireless AP 212 will attempt to use the 40 MHz channel 110, since channel 110 includes the primary channel 108. In some implementations, interference weights are based on a function of the amount of overlap between the primary channels associated with each of two APs and the total channel bandwidths the two APs are attempting to use. In a first example, a respective interference weight is 1.0 when two APs are using (or are attempting to use) the same 80 MHz channel (e.g., channel 42) and the same 20 MHz primary channel (e.g., channel 36). In second example, a respective interference weight is 0.75 when a first AP is using (or is attempting to use) a 80 MHz channel (e.g., channel 42) that overlaps with a 40 MHz channel (e.g., channel 38) used by a second AP, and the first and second APs are using the same 20 MHz primary channel (e.g., channel 36). In a third example, a respective interference weight is 0.5 when first and second APs are using (or are attempting to use) the same 80 MHz channel (e.g., channel 42) and the same 40 MHz channel (e.g., channel 38), but are using separate 20 MHz primary channels (e.g., channels 36 and 40) within the same 40 MHz channel. In a fourth example, a respective interference weight is 0.25 when first and second APs are using (or is attempting to use) the same 80 MHz channel (e.g., channel 42), but do not use the same 40 MHz channels, and also use separate 20 MHz primary channels (e.g., channels 36 and 44).

Figure 6:
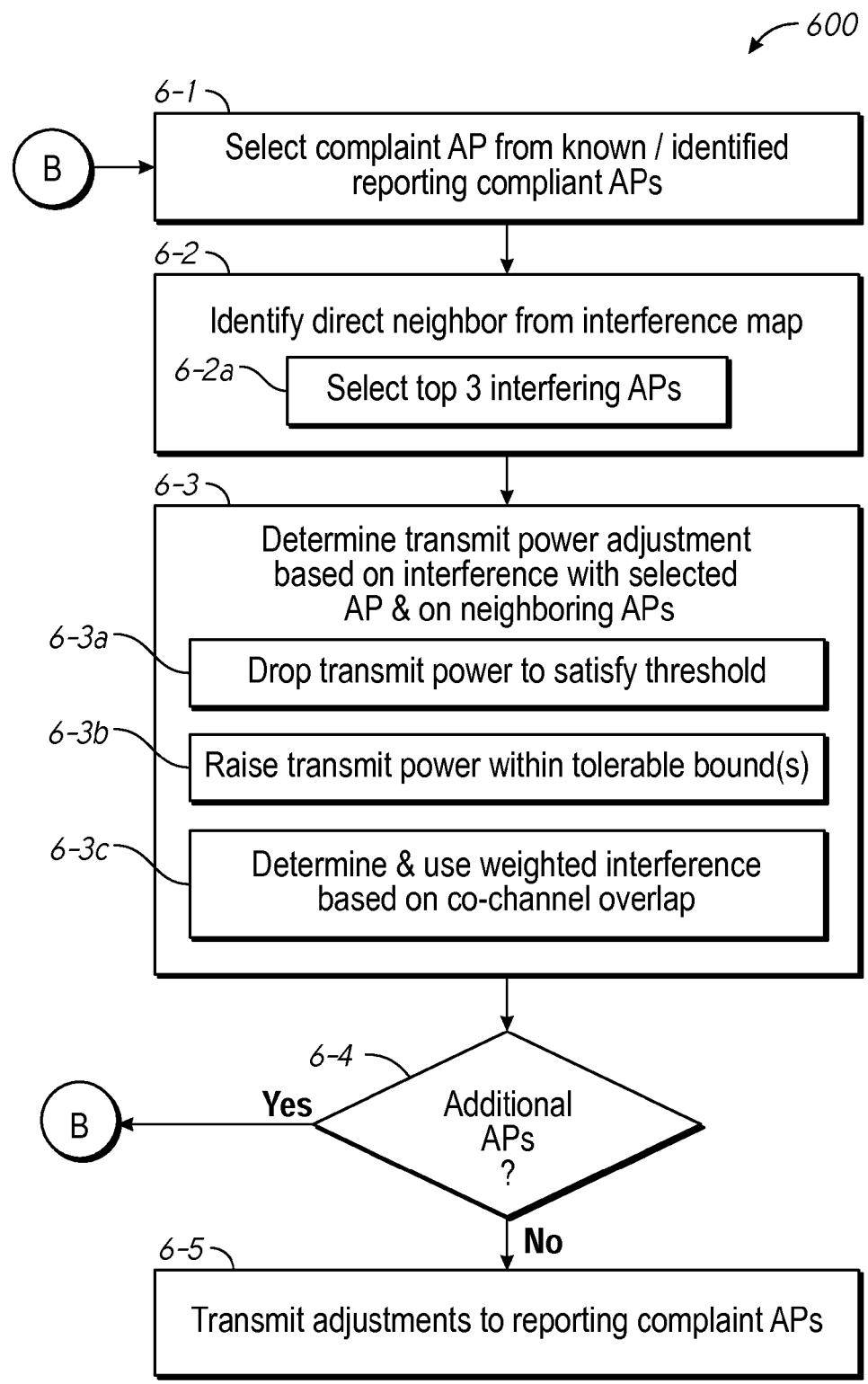
FIG. 6 is a flowchart representation of a method of managing interference among a number of wireless APs in accordance with some implementations.

FIG. 6 is a flowchart representation of a method 600 of jointly managing interference amongst a number of wireless APs according to some implementations. In some implementations, the method 600 is performed by a wireless network AP controller. For example, with reference to FIG. 1, in some implementations, the wireless network AP controller is integrated and/or co-located with the cloud hosted network management server 112, or more generally, in the cloud hosted network management system 110. The wireless network AP controller, in such implementations, is configured to coordinate the operation of a number of compliant wireless APs 153 by way of communicating instructions through the metadata tunnel 160 to the LAN 150. In some implementations, the wireless network AP controller is integrated and/or co-located with one of the gateway node 151 and the network root node 152, and is configured to coordinate the operation of a number of compliant wireless APs 153 locally within the LAN 150. Briefly, the method 600 includes using an interference map to identify neighboring wireless APs that are interfering with each other, and adjusting power transmission levels to satisfy interference criteria for a combination of neighboring wireless APs.

To that end, as represented by block 6-1, the method 600 includes selecting a compliant wireless AP from a number of known and/or identified reporting compliant APs. For example, as noted above with respect to FIG. 1, in some implementations, compliant devices, including the compliant wireless APs 153, are configured to communicate and operate in accordance with configuration instructions, software and/or firmware updates, and rules provided by the cloud hosted network management system 110. As represented by block 6-2, the method 600 includes identifying direct neighboring wireless APs of the selected compliant wireless AP. For example, with reference to FIG. 2, interfering neighbors of the second wireless AP 212 may include the first, third, fourth and fifth wireless APs 211, 213, 214, 215. In some implementations, as represented by block 6-2a, identifying direct neighboring wireless APs includes selecting the top three (for example) neighboring wireless APs, based on the received power levels, that interfere with the selected compliant wireless AP. Continuing the example, the top three interfering neighbors of the second wireless AP 212 may include the third, fourth and fifth wireless APs 213, 214, 215.

As represented by block 6-3, the method 600 includes determining a transmit power adjustment based on interference with selected wireless AP and on identified, interfering neighboring wireless APs. In other words, the method 600 includes determining how much to change the transmit power of one of the selected wireless APs and/or one or more of the identified, interfering neighboring wireless APs so that a level of interference is adjusted at one of the selected wireless APs and/or one or more of the identified, interfering neighboring wireless APs. For example, as represented by block 6-3a, the method includes dropping the transmit power level of at least one of the selected wireless APs and/or one or more of the identified, interfering neighboring wireless APs in order to satisfy a threshold characterizing a preferred interference level. In another example, as represented by block 6-3b, the method includes raising the transmit power level of at least one of the selected wireless APs and/or one or more of the identified, interfering neighboring wireless APs within a tolerable bound, so that the coverage range can be extended for the particular wireless AP. In another example, as represented by block 6-3c, the method includes determining and using the weighted interference values based on co-channel overlap in order to determine the transmit power.

As represented by block 6-4, the method 600 includes determining whether or not there are additional compliant wireless APs left to consider. If there are additional compliant APs left to consider ("Yes" path from block 6-4), the method loops back to the portion of the method represented by block 6-1. On the other hand, if there are no additional compliant APs left to consider ("No" path from block 6-4), in some implementations, as represented by block 6-5, the method includes transmitting the transmit power adjustments to the respective reporting compliant APs. For example, with reference to FIG. 1, the cloud hosted network management server 112 transmits the transmit power adjustments to the reporting compliant APs 153 using the metadata tunnel 160, when the network control entity resides in the cloud hosted network management server 112 (or generally within the cloud hosted network management system 110). In another example, the gateway node 151 (or another node in the LAN 150) transmits the transmit power adjustments to the reporting compliant APs 153, when the network control entity resides within the LAN 150.

Figure 7:
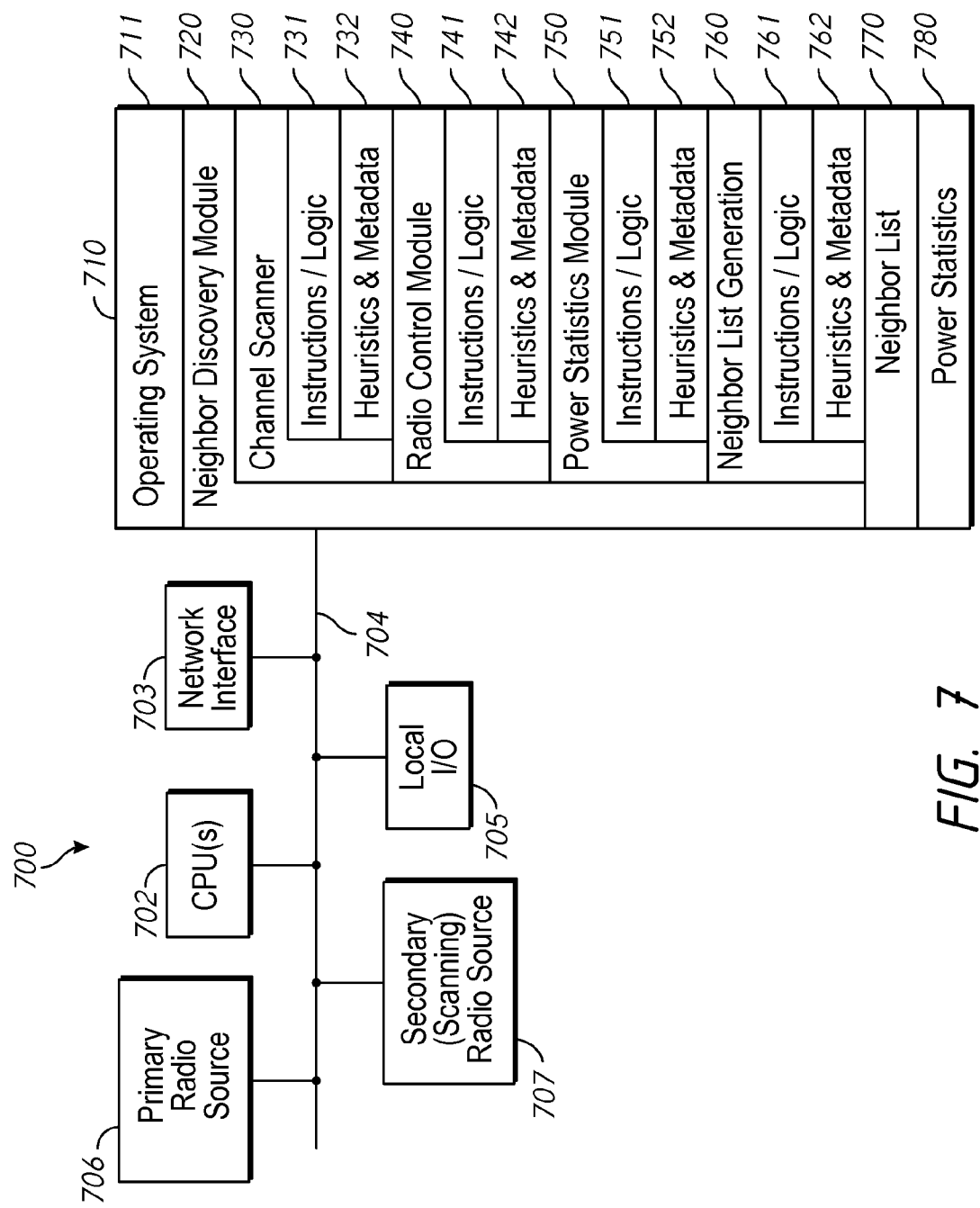
FIG. 7 is a block diagram of an example of a wireless AP enabled in accordance with some implementations.

FIG. 7 is a block diagram of an example of a wireless AP 700 configured in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the wireless AP 700 includes one or more processing units (CPU's) 702, a network interface 703, a memory 710, a programming (I/O) interface 705, a primary radio resource 706, a secondary radio resource 707, and one or more communication buses 704 for interconnecting these and various other components.

In some implementations, the primary radio resource 706 is provided to support and facilitate traffic bearing communications between the wireless AP 700 and one or more client devices (e.g., laptop 157*a*, workstation 157*b*, smartphone 157*c*, etc. shown in FIG. 1). In some implementations, the primary radio resource 706 includes first and second radio transceivers. In some implementations, the primary radio resource 706 includes one radio transceiver. In some implementations, the secondary radio resource 707 is provided to scan available channels in order to identify neighboring wireless APs to produce a neighbor list, and includes at least one radio receiver—which may be a third radio in various implementations.

In some implementations, the communication buses 704 include circuitry that interconnects and controls communications between system components. The memory 710 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 710 optionally includes one or more storage devices remotely located from the CPU(s) 702. The memory 710 comprises a non-transitory computer readable storage medium. In some implementations, the memory 710 or the non-transitory computer readable storage medium of the memory 710 stores the following programs, modules and data structures, or a subset thereof including an operating system 711, a neighbor discovery module 720, a neighbor list buffer 770, and a power statistics buffer.

The operating system 711 includes procedures for handling various basic system services and for performing hardware dependent tasks.

In some implementations, the neighbor discovery module 720 is configured to scan available channels in order to identify neighboring wireless APs to produce a neighbor list, and curating the resulting neighbor list in order to limit the neighbor list to a listing of pertinent neighboring wireless APs that are likely to interfere with the wireless AP 700. To that end, in various implementations, the neighbor discovery module 720 includes a channel scanner 730, a radio control module 740, a power statistics module 750, and a neighbor list generation module 760. In various implementations, these and other modules included in the client device 700 include a suitable combination of software, hardware and/or firmware including digital logic, machine-executable computer code instructions and programmable logic.

In some implementations, the channel scanner 730 is configured to scan channels that are available for use for by the wireless AP 700. In accordance with various implementations, the channel scanner 730 uses the secondary radio resource 707 to scan the available channels without interrupting communications supported by the two primary radio resource 706. In other implementations, a dedicated radio resource includes scheduling time slots during which the primary radio resource 706 used to scan the available channels (i.e., time multiplexing diagnostic scanning). The time slots are scheduled between traffic bearing time slots provided by the primary radio resource in order to collect interference measurements by the wireless AP 700. To that end, in various implementations, the channel scanner 730 includes instructions and/or logic 731, and heuristics and metadata 732.

In some implementations, the radio control module 740 is configured to manage the operation of the primary and second radio resources 706, 707. For example, the radio control module 740 is provided to effectuate transmit power adjustments in accordance with instructions and/or adjustment indicators provided by a network control entity, which resides in a cloud hosted network management system or locally within the same LAN or portion of a VLAN as the wireless AP 700. To that end, in various implementations, the radio control module 740 includes instructions and/or logic 741, and heuristics and metadata 742.

In some implementations, the power statistics module 750 is configured to generate received power statistics characterizing the received transmissions from neighboring wireless APs. To that end, in various implementations, the power statistics module 750 includes instructions and/or logic 751, and heuristics and metadata 752.

In some implementations, the neighbor list generation module 760 is configured to create a neighbor list by detecting and recognizing the neighboring wireless APs by receiving transmissions that are each above a threshold power level, and demodulating and parsing the received transmissions in order to identify a respective device identifier associated with each of the neighboring wireless APs. To that end, in various implementations, the neighbor list generation module 760 includes instructions and/or logic 761, and heuristics and metadata 762.

Figure 8:
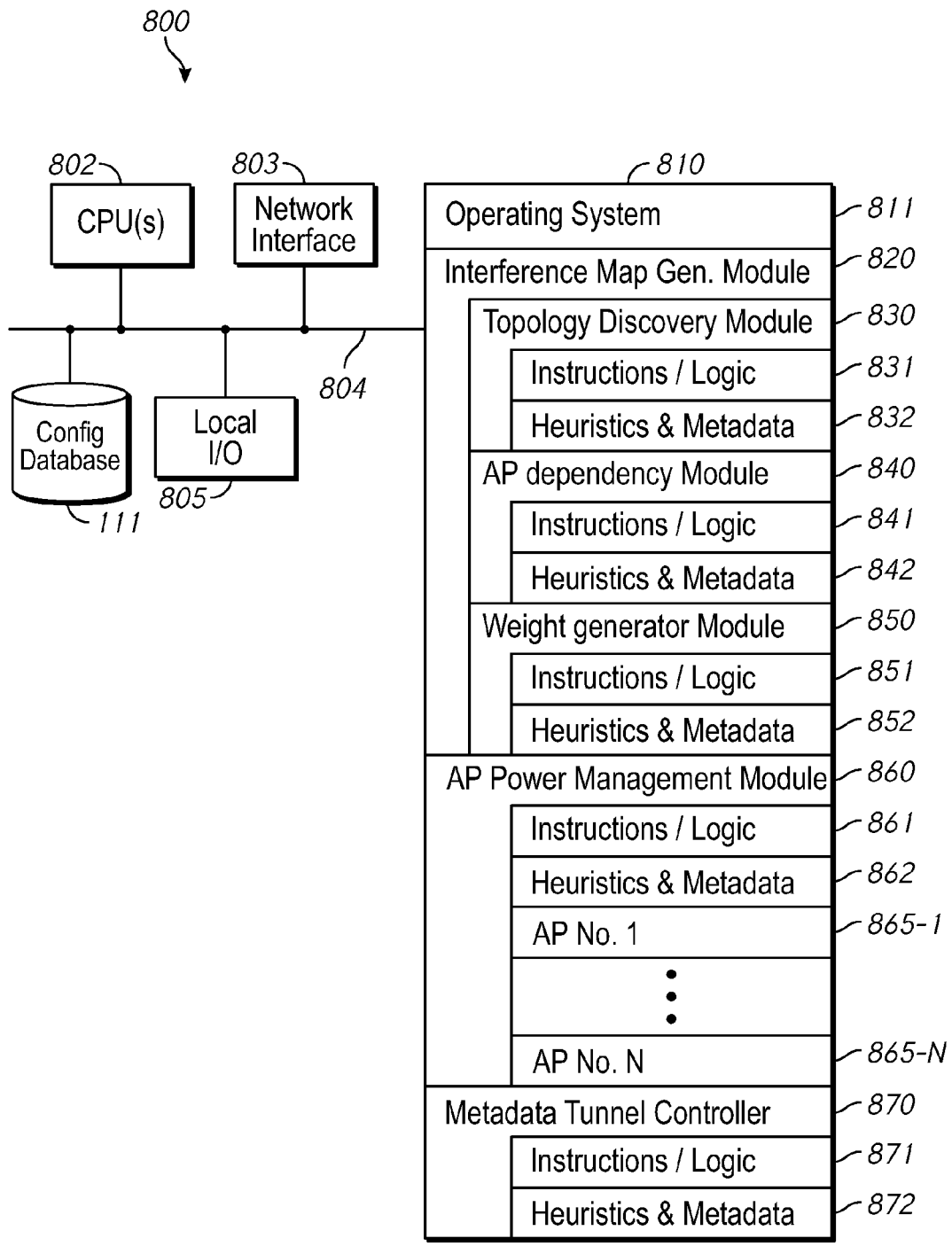
FIG. 8 is a block diagram of an example of a network AP controller system enabled in accordance with some implementations.

FIG. 8 is a block diagram of an example of a network AP controller system 800 configured in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the network AP controller system 800 includes one or more processing units (CPU's) 802, a network interface 803, a memory 810, a programming (I/O) interface 805, and one or more communication buses 804 for interconnecting these and various other components.

In some implementations, the communication buses 804 include circuitry that interconnects and controls communications between system components. The memory 810 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 810 optionally includes one or more storage devices remotely located from the CPU(s) 802. The memory 810 comprises a non-transitory computer readable storage medium. In some implementations, the memory 810 or the non-transitory computer readable storage medium of the memory 810 stores the following programs, modules and data structures, or a subset thereof including an optional operating system 811, an interference map generation module 820, an AP power management module 860, and a metadata tunnel controller 870.

The operating system 811 includes procedures for handling various basic system services and for performing hardware dependent tasks.

In some implementations, the interference map generation module 820 is configured to generate an interference map based on co-channel interference reporting included in neighbor lists reported from compliant wireless APs. In some implementations, the interference map also includes adjacent channel interference, when received transmissions from neighboring wireless APs are above a threshold level on channels that are adjacent to channels used a particular wireless AP. In some implementations, the interference map includes a listing of relational interference indicators that characterize the interference between wireless APs. To that end, in various implementations, the interference map generation module 820 includes a topology discovery module 830, an AP dependency module 840, and a weight generator module 850. In various implementations, these and other modules included in the network AP controller system 800 include a suitable combination of software, hardware and/or firmware including digital logic, machine-executable computer code instructions and programmable logic.

In some implementations, the topology discovery module 830 is configured to identify neighboring wireless APs included in a LAN or a portion of a VLAN from neighbor lists reported by compliant wireless APs. To that end, in various implementations, the topology discovery module 830 includes instructions and/or logic 831, and heuristics and metadata 832.

In some implementations, the AP dependency module 840 is configured to determine logical network separation and grouping of wireless APs in order to selectively enforce transmit power control on a group of wireless APs. For example, in some implementations, logical network separation and grouping of wireless APs is based on applying network MAC addresses as a filter against a list of known in-network neighboring MAC addresses. To that end, in various implementations, the AP dependency module 840 includes instructions and/or logic 841, and heuristics and metadata 842.

In some implementations, the weight generator module 850 is configured to generate interference map weights. The severity of interference between two wireless APs is a function of the amount of coverage area overlap and the amount of frequency band overlap based on the channel usage of the two wireless APs. When two wireless APs with overlapping coverage areas transmit on at least a portion of the same channel(s), the two wireless APs will likely interference with each other to some degree. In some implementations, an interference weight associated with a first wireless AP on a particular channel is a normalized ratio characterizing how much channel usage of a second wireless AP overlaps with channel usage of the first wireless AP. Continuing the example above with reference to FIGS. 2 and 3, an interference weight for the 40 MHz channel 102 used by the fifth wireless AP 215 in relation to the second wireless AP 212 is 1.0, because the 80 MHz channel 106 used by the second wireless AP 212 completely overlaps the 40 MHz channel 102. In contrast, an interference weight for the 80 MHz channel 106 used by the second wireless AP 212 in relation to the fifth wireless AP 215 is 0.5, because the 40 MHz channel 102 used by the fifth wireless AP 215 partially overlaps the 80 MHz channel 106. In some implementations, the ratio that a weight is based on is the reciprocal of the examples provided herein, because the ratio and the weight is provided to characterize the degree of interference between wireless APs that share at least some amount of spectrum. In this way, in accordance with various implementations, interference weights are generated for pairs of wireless APs that are identified as interring with one another on a per channel basis. To that end, in various implementations, the weight generator module 850 includes instructions and/or logic 851, and heuristics and metadata 852.

In some implementations, the AP power management module 860 is configured to determine transmit power adjustments based on interference levels between compliant wireless APs in the same LAN or portion of a VLAN. To that end, in various implementations, the AP power management module 860 includes instructions and/or logic 861, and heuristics and metadata 862. Additionally, the AP power management module 860 includes power adjustment and interference data for each of a plurality of wireless access points, namely, AP No. 1 (865-1) to AP No. N (865-N).

In some implementations, the metadata tunnel controller 880 is configured to establish a metadata tunnel to a LAN or a portion of a VLAN from the network AP controller system 800. For example, with reference to FIG. 1, the cloud hosted management server 112 establishes the metadata tunnel 160 to the LAN 150. As noted above, the metadata tunnel 160 extends between the gateway 115 of the cloud hosted management system 110 and the gateway node 151 of the LAN 150, through portions of the Internet 120 and the infrastructure of the ISP 140. To that end, in various implementations, the metadata tunnel controller 880 includes instructions and/or logic 881, and heuristics and metadata 882.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   generating, at a network controller, an interference map based at least on co-channel interference reported in a number of neighbor lists, wherein each of the neighbor lists is associated with a respective one of a plurality of compliant wireless access points included in one of a local area network (LAN) and a portion of a virtual LAN (VLAN), wherein the interference map includes interference weights that are based on an amount of co-channel overlap; and
   effectuating a change in a respective transmit power level for at least one of the plurality of compliant wireless access points included in the interference map based on at least one interference criterion characterizing the interference on each of the plurality of compliant wireless access points included in the interference map and respective neighboring wireless access points.

2. The method of claim 1, wherein the interference map includes one or more relational interference indicators that characterize the interference between wireless access points.

3. The method of claim 1, further comprising generating the interference map to include adjacent channel interference indicators reported in one or more of the neighbor lists, wherein adjacent channel interference indicators are included in a neighbor list when received transmissions from neighboring wireless access points are above a threshold level on channels that are adjacent to channels used by a particular wireless access point.

4. The method of claim 1, wherein one of the interference weights, associated with a first wireless access point on a particular channel, is a function of a normalized ratio characterizing how much channel usage of a second wireless access point overlaps with channel usage of the first wireless access point.

5. The method of claim 1, wherein effectuating the change in the respective transmit power level includes effectuating a drop in the respective transmit power level of the at least one of the plurality of compliant wireless access points in order to satisfy a threshold characterizing a preferred interference level.

6. The method of claim 1, wherein effectuating the change in the respective transmit power level includes effectuating a raise in the respective transmit power level of the at least one of the plurality of compliant wireless access points within a tolerable bound, so that a corresponding coverage range is extended.

7. The method of claim 1, wherein effectuating the change in the respective transmit power level includes using one or more of the interference weights in order to determine a transmit power value for the respective transmit power level.

8. The method of claim 1, further comprising transmitting a request for neighbor list reports to the plurality of compliant wireless access points included in one of the LAN and the portion of the VLAN.

9. The method of claim 1, wherein effectuating the change in the respective transmit power level for the at least one of the plurality of complaint wireless access points includes transmitting a transmit power value to the at least one of the plurality of compliant wireless access points.

10. A system comprising:
    an interference map generation module configured to generate an interference map based at least on co-channel interference reported in a number of neighbor lists, wherein each of the neighbor lists is associated with a respective one of a plurality of compliant access points included in one of a LAN and a portion of a VLAN), wherein the interference map includes interference weights that are based on an amount of co-channel overlap; and
    a power management module configured to effectuate a change in a respective transmit power level for at least one of the plurality of compliant wireless access points included in the interference map based on at least one interference criterion characterizing the interference on each of the plurality of compliant wireless access points included in the interference map and respective neighboring wireless access points.

11. The system of claim 10, wherein the interference map includes one or more relational interference indicators that characterize the interference between wireless access points.

12. The system of claim 10, wherein the interference map generation module comprises:
    a topology discovery module configured to identify neighboring wireless access points included in the LAN or the portion of the VLAN from neighbor lists reported by compliant wireless access points; and
    an access point dependency module configured to determine logical network separation and grouping of wireless access points in order to selectively enforce transmit power control on a group of wireless access points.

13. The system of claim 12, wherein the interference map generation module is further configured to generate the interference map to include adjacent channel interference indicators reported in one or more of the neighbor lists, wherein adjacent channel interference indicators are included in a neighbor list when received transmissions from neighboring wireless access points are above a threshold level on channels that are adjacent to channels used by a particular wireless access point.

14. The system of claim 10, wherein the interference map generation module comprises a weight generator module that is configured to generate the interference weights based on the amount of co-channel overlap.

15. The system of claim 10, wherein one of the interference weights, associated with a first wireless access point on a particular channel, is a function of a normalized ratio characterizing how much channel usage of a second wireless access point overlaps with channel usage of the first wireless access point.

16. The system of claim 10, wherein the power management module is further configured to effectuate the change in the respective transmit power level by dropping the respective transmit power level of the at least one of the plurality of compliant wireless access points in order to satisfy a threshold characterizing a preferred interference level.

17. The system of claim 10, wherein the power management module is further configured to effectuate the change in the respective transmit power level by raising the respective transmit power level of the at least one of the plurality of compliant wireless access points within a tolerable bound, so that a corresponding coverage range is extended.

18. The system of claim 10, wherein the power management module is further configured to effectuate the change in the respective transmit power level by using one or more of the interference weights in order to determine a transmit power value for the respective transmit power level.

19. A device comprising:
  a network interface;
  one or more processors; and
  a non-transitory memory including computer code instructions that when executed by the processor cause the device to:
  generate an interference map based at least on co-channel interference reported in a number of neighbor lists, wherein each of the neighbor lists is associated with a respective one of a plurality of compliant wireless access points included in one of a local area network (LAN) and a portion of a virtual LAN (VLAN), wherein the interference map includes interference weights that are based on an amount of co-channel overlap; and
  effectuate a change in a respective transmit power level for at least one of the plurality of compliant wireless access points included in the interference map based on at least one interference criterion characterizing the interference on each of the plurality of compliant wireless access points included in the interference map and respective neighboring wireless access points.

* * * * *